United States Patent [19]

Bleeker et al.

[11] Patent Number: 4,670,550

[45] Date of Patent: Jun. 2, 1987

[54] BIOPOLYMER FORMULATIONS AND PROCESSES FOR PREPARING THEM

[75] Inventors: Jan J. Bleeker; Jan H. Lammers; Jacob B. Roest; Rudolf J. A. Eckert, all of Amsterdam, Netherlands

[73] Assignee: Shell Oil Company, Houston, Tex.

[21] Appl. No.: 648,791

[22] Filed: Sep. 7, 1984

[30] Foreign Application Priority Data

May 11, 1984 [GB] United Kingdom ................. 8412053

[51] Int. Cl.$^4$ ....................... C08B 37/00; E21B 43/22
[52] U.S. Cl. .................... 536/114; 106/208; 252/8.51; 252/8.551; 252/8.554; 252/363.5
[58] Field of Search ...................... 252/8.55 D, 8.55 R, 252/8.5 C, 363.5; 536/114; 106/208

[56] References Cited

U.S. PATENT DOCUMENTS

| 3,734,873 | 5/1973 | Anderson et al. | 252/8.55 X |
|---|---|---|---|
| 3,979,349 | 9/1976 | Fink et al. | 524/300 X |
| 4,052,353 | 10/1977 | Scanley . | |
| 4,312,675 | 1/1982 | Pickens et al. | 106/174 X |
| 4,325,861 | 4/1982 | Braun et al. | 106/191 |
| 4,374,216 | 2/1983 | Dammann | 524/55 X |
| 4,393,151 | 7/1983 | Dawans et al. | 252/363.5 X |
| 4,571,422 | 2/1986 | Symes et al. | 252/8.55 |

FOREIGN PATENT DOCUMENTS

| 1482515 | 8/1977 | United Kingdom . |
|---|---|---|
| 2018300 | 10/1979 | United Kingdom . |

Primary Examiner—Herbert B. Guynn

[57] ABSTRACT

Biopolymer formulation, in particular a polysaccharide-containing water in oil emulsion, process for preparing such emulsions and process for concentrating these emulsions. Aqueous systems thickened by the incorporation of biopolymer emulsions.

9 Claims, No Drawings

BIOPOLYMER FORMULATIONS AND PROCESSES FOR PREPARING THEM

The present invention relates to a biopolymer formulation and in particular to a polysaccharide-containing water in oil emulsion, a process for preparing such emulsions and a process for concentrating it.

Polysaccharides play an important roll as basic materials for the food industry. However an increasing interest for other applications is being developed, such as in printing ink, wherein they act as thickeners. In particular because of their ability to thicken these polysaccharides are now also applied in enhanced oil recovery operations and also appear to be very useful in drilling fluids and completion fluids at oil exploration sites. Since highly concentrated aqueous solutions still only contain up to ten percent by weight of these biopolymers transport over long distances is not very economic especially when large amounts, required for enhanced oil recovery operations, have to be transported. Furthermore highly concentrated aqueous biopolymer solutions are difficult to handle because of their high viscosity which may cause pumping problems and losses when discharging containers. Therefore methods are being developed to obtain concentrates containing a higher percentage of the desired material in order to decrease the transport cost and improve the handability. UK patent application No. 2018300 describes dispersions in oil of thickening agents such as xanthan polysaccharides which can reach concentrations of up to 40% wt of the thickening agent. In order to prepare such dispersion one uses the biopolymer in powdered form as a starting material.

However handling of powder is not entirely without difficulties. Dust problems inherent to the handling of powders and the fact that the powder has the tendency to clot when brought in contact with the dispersing liquid make the powderform less attractive. It has now been found that biopolymer in oil emulsions can be prepared having a concentration of polysaccharide which is much higher than 40% wt and which emulsions appear to be surprisingly stable. The present emulsions can suitably be prepared from aqueous solutions of polysaccharides having a concentration of up to about ten percent by weight.

Furthermore, it is a characterising feature of the present invention that polysaccharides are substantially present in the emulsion in the form of globules or droplets which are still in a more or less swollen state and which, as is believed, makes them dissolve into water more easily than substantially water-free particles. This characteristic of the present emulsion is especially in enhanced oil operations and when the emulsion is used e.g. in drilling muds and in well-completion fluids—very important, because for those applications free-flowing and easy water dissolvable polysaccharide formulations are required. In conventional dispersions of polysaccharides derived from dry polysaccharide powder, the biopolymer particles are substantially water-free and therefore dissolve more slowly into water. They tend to stick together thus forming clots. Furthermore filterability problems can arise when dispersions are rehydrated.

Accordingly the present invention provides a biopolymer water in oil emulsion comprising 1–70% biopolysaccharide in the form of water-swollen particles, 10–60% wt hydrophobic liquid, 5–60% wt water and 1–25% wt emulsifier.

Preferable the biopolymer water-in-oil emulsion comprises in addition to 30–65% wt polysaccharide, 15–40% wt hydrophobic liquid, 5–25% wt water and 5–25% wt emulsifier, and 1–15% wt stabiliser. The emulsion according to thepresent invention may optionally contain mixtures of two or more emulsifying agents together with mixtures of two or more stabilising agents.

Emulsifiers can suitably be selected from non-ionic like alkylphenol- ethoxylates, ethoxylated long chain fatty acids, polyethylene glycol mono-oleates, polyethyleneglycol-dioleates, polyethyleneglycol-laurates, sorbitan fatty acid esters such as the "Span" (registered trade mark) emulsifiers, which are emulsifiers of the German company Atlas Chemie GmbH, especially "Span 80" which is sorbitan mon-oleate and ethoxylated linear alcohols like "Dobanol", a trade mark of Shell. "Dobanol" stands for a series of synthetic primary fatty alcohols having 9 to 15 carbon atoms. Further examples of suitable emulsifiers are the product from the company AKZO i.e. sorbitan-monolaurate, sorbitan-mono-palmitate and sorbitan-mono-stearate sold under respectively the trade marks "Armotan" ML, "Armotan" MP and "Armotan" MS. Also the ethoxylated versions of the above compounds are suitable. Those are sold under the trademarks "Armotan" PML 20, Armotan PMP 20 and Armotan PMS 20. Further combinations of the non-ethoxylated and ethoxylated emulsifiers might be used. Sorbitan fatty acids can suitably be combined with poly- oxyethylene sorbitan fatty acid esters. Other exampels of non-ionic emulsifiers can be found in the group of the ethoxylated octyl- and nonylphenols and the ethoxylated alcohols.

Cationic emulsifiers like ethoxylated fatty amines and primary fatty amines or other amine type of emulsifies which are oil soluble can also be applied for preparing a biopolymer in oil emulsion. "Ethomenes" and "Armenes" of Akzo Chemie Nederland b.v. based on tallow, cocco, soya and oleic oil such as "Ethomeen T12" (registered trade mark) (bis(2-hydroxy)tallowamine), "Armeen HT" (registered trade mark) (tallowamine) are very suitable examples.

Preferably the emulsifier is selected from the group consisting of sorbitan-mono-oleate, sorbitan mono-laurate, ethoxylated alkylphenol, sorbitan-mono-palmitate, sorbitan-mono-stearate and/or the ethoxylated derivatives thereof, poly (isobutylene - maleic anhydride) reacted with triethylene tetraamine, bis(2-hydroxyethyl) tallowamine, tallowamine or combinations thereof.

A preferred combination of non-ionic emulsifiers is a mixture of sorbitan mono-oleate and sorbitan mono-laurate and an ethoxylated alkylphenol and/or a mixture of poly (isobutylene - maleic anhydride) reacted with triethylene tetraamine and bis(2-hydroxyethyl) tallowamine.

Stabilisers which apear to be highly suitable are selected from the group consisting of polyalkylmethacrylates, polyalkylacrylates, copolymers of alkyacrylates with vinyl pyridines and copolymers of alkylmethacrylates with vinyl pyridines. Their composition and their molecular weights may vary considerably. Typical examples are:

a copolymer of C20/22-acrylate and minor amounts of C16/18-acrylate having a weight average molecular weight (Mw) of 200.000–500.000 and a number average molecular weight (Mn) of 49.000–76.000 as a ca. 50% w solution in toluene or xylene;

the toluene solution (40% w of active matter) of a copolymer of C20/22-acrylate (89.4% w) and 4-vinyl pyridine (10.6% w) having a Mw=70.000 to 270.000 and Mn=25.000–55.000;

a 40% w concentrate in an HVI-oil 60 of a copolymer of C16/18-aklylmethacrylate (44.5% w), Dobanol 25-methacrylate (10.0% w) and Linevol 911-methacrylate (45.5% w) with Mw=40.000–600.000 and Mn=20.000–150.000;

a copolymer of C16/18-alkylmethacrylate (21.6% w). Dobanol 25-methacrylate (54.9%). Linevol 911-methacrylate (18.1% w) and 4-vinyl pyridine (5.4% w) with molecular weight Mw=155.000–200.000 and Mn=60.000–80.000 as a ca. 55% w concentrate in a mineral oil; a copolymer of C16/18-alkylmethacrylate (4.0% w). Dobanol 25-methacrylate (76.7% w), Linevol 911-methacrylate (8.2% w) and methyl methacrylate (11.1% w) with Mw=105.000–140.000 and Mn=40.000–60.000 as as 60–65% w solution in a mineral oil;

copolymers of C16/18-alkylmethacrylate (30.1% w), Dobanol 25 methacrylate (47.8% w) and 2- or 4-vinyl pyridine (22.1% w) with Mw=40.000–65.000 and Mn of Ca. 22.000 as 44% w solutions in xylene.

"Dobanol 25" is a mixture of primarily primary lineair C12/15-alcohols. "Linevol 911" is a mixture of primarily primary C9/11-alcohols.

Other additives, such a dispersing agents can suitably be present in the water-in-oil emulsion according to the invention in order to enhance the dispersibility of the formulation. Hydration time is shortened and the viscosity development is enhanced and is faster when dispersing agents are used.

Suitable dispersing agents are hydrofilic surfactants, known to those skilled in the art, like ethoxylated alkylphenols and ethoxylated alcohols sulfonates. Preferred dispersing agents are selected from the group consisting of "Nonidet - NP50", Dobanol or combinations thereof. "Nonidet-NP50" is nonylphenol ethoxylate.

Preferably the polysaccharide is derived from microorganisms like *Xanthomonas campestris* NCIB11808, *Xanthomonas campestris* NCIB11854, Pseudomonas sp. NCIB11624 and Pseudomonas sp. NCIB11592 since these microorganisms are commercially readily available.

However the polysaccharide may also be suitably produced by other micro-organisms like *Xanthomonas phaseoli, Xanthomonas carotae, Xanthomonas begomiae, Xanthomonas meanae, Xanthomonas malvacearum, Xanthomonas vesicatoria, Xanthomonas papavericola, Xanthomonas incanae, Xanthomonas translucens, Rhizobium meliloti, Alcaligenes faecalis var. myxogenes, Agrobacterium tumefaciens, Agrobacterium radiobacter,* and *Agrobacterium rhizogenes.*

The polysaccharides is suitably applied in the form of an aqueous solution which may be obtained by ultrafiltrating and optionally concentrating of a fermentation broth, as described in European patent application No. 81201026.2, and/or enzyme treatment, as described in European patent application No. 81200414.1, and/or enzyme/surfactant treatment, as described in European patent application No. 82201253.0, and/or contacting the fermentation broth with particles of solid siliceous material at an adsorption—enhancing pH, as described in UK Patent Specification No. 1598594.

Preferably the polysaccharide is derived from a clarified and optionally concentrated fermentation broth being an aqueous solution, substantially free from cellular debris which contains 3–25% wt of polysaccharides. An emulsion prepared from this startng material may therefore contain as low as 1% wt polysaccharide.

The hydrophobic liquid is suitably an unsubstituted and/or substituted hydrocarbon liquid which encompasses aliphatic and aromatic compounds.

For instance hydrocarbons like a mineral oil, a kerosine or a napthta are suitable so are orgaic hydrocarbons like benzene, xylene and tolene. An oilphase on the basis of branched hydrocarbons for instance on the basis of isoparaffins is particularly suitable. Further water immiscible alcohols having 8 to 20, preferably 8 to 12 carbon-atoms, vegetable oils such as cornoil, peanut oil, soybean oil, and sunflower oil, esteralcohols, polyolethers or other heteroatoms containing compounds for instance siliconoils may suitably be used as well. Certain halogenated hydrocarbons have also been found useful.

Preferably the hydrophobic liquid is a white spirit or a mixture of white spirits.

A preferred emulsion according to the present invention comprises comprises 30–60% wt polysaccharide derived from *Xanthomonas campestris* NCIB 11808, *Xanthomonas campestris* NCIB 11854, Pseudomonas sp. NCIB 11624 and/or Pseudomonas sp. NCIB 11592, 25–45% wt of white spirit, 5–25% water and 5–20% of a mixture of sorbitan mono-oleate and sorbitan mono-laurate and/or a mixture of poly (isobutylene—maleic anhydride) reacted with triethylene tetraamine and bis(2-hyroxyethyl)tallowamine.

The emulsions according to the present invention can be prepared using emulsification techniques known in the art. The present invention further provides a biopolymer emulsion which is obtained after a biopolymer emulsion as hereinbefore described has been subjected to a shear treatment in high shear devices or to milling in a colloid mill whereby the size of the polysaccharide globules or droplets is substantially reduced and a finer emulsion is obtained. Besides emulsifers the emulsions according to the present invention may also suitably contain stabilising agents, suspending agents and surfactants to enhance e.g. stability and hydration, wettability of the polymer droplets upon dissolution in water. Furthermore the viscosity of the emulsion can be adjusted to ones wishes by adding oil viscosifiers, which are suitably oil-soluble polymers. Also thickeners can be employed to increase the viscosity of the hydrophobic liquid or oil and to improve storage stability. Suitable examples of thickners include organophilic clays like the bentonites or montmorillonites which are amine treated to make them organophilic. Other thickeners which may be suitably employed are colloidal silica, fumed silica and the like. Commercially available thickener are "Cab-o-Sil" (by Cabot) and Thixogel (by Sudchemie). Additional thickeners include metallic soaps, such as the metal salts of higher monocarboxylic acids.

The present invention also relates to an aqueous system whenever thickened by the incorporation of a biopolymer emulsion as described hereinbefore. Such an aqueous system is for instance a printing ink.

Preferably the aqueous system is a flooding material which is used in enhanced oil recovery operations. Still further the present invention provides a process for concentrating a biopolymer emulsion as hereinbefore described which comprises removing water from the emulsion by evaporation under reduced pressure and at elevated temperature in order to get a higher concentration of biopolymers in the water in oil emulsion. Preferably the process is continued until the concentration of the biopolymers is in the range of 35–45% wt since it appears that at a concentration in that range the emulsion is most easily hydrated than at higher concentrations. However if desired further concentrations towards 70% wt can be achieved.

The emulsion may also be concentrated by other evaporation techniques like azeotropic distillation, vacuum drying, spray drying and microwave drying.

Still preferably the concentration is achieved by filmevaporation which may suitably be carried out with a falling or climbing film-evaporation and/or wiped film evaporation.

Most preferably evaporation is carried out in a rota vapor or a wiped film evaporator. In the present process the reduced pressure is preferably in the range of 1–50 mm Hg and the temperature is in the range of 40°–120° C. The residence time of the biopolymer emulsion in the film-evaporation equipment is short and suitable in the range of 1–20 min since longer residence times at higher temperatures might harm the biopolymer.

If the biopolymer emulsion appears to contain relatively coarse (0,1–5 mm) biopolymer droplets which may not be desired than the biopolymer emulsion is preferably subjected to a shear treatment or processed through a colloid mill in order to obtain an emulsion containing finer biopolymer droplets.

The present invention will be further described with reference to the following Examples.

EXAMPLE 1

2 g "Span 20" (sorbitan-mono-laurate) and 2 g "Span 80" (sorbitan-mono-oleate)+196 g white spirit ("Shell Q3312") were mixed in a beaker glass. 200 g (9% wt Xanthan biopolymer aqueous concentrate, obtained by ultra-filtration) was added while using an ultra turrax mixed for 1 minute. An emulsion was obtained and appears to be stable at 20° C. and 60° C. for at least three weeks.

EXAMPLE 2

1,6 g "Span 20" and 1,6 g "Span 80"+197g white spirit ("Shell Q5911") were mixed in a beaker glass. 200 g Xanthan biopolymer aqueous concentrate (9% wt) was added, while using an ultra turrax mixer for 1 min. An emulsion was obtained which appears to be stable at 20° C. and 60° C. for at least three weeks.

EXAMPLE 3

An emulsion was prepared according to Example 2 however with the difference that 0,8 g "Span 20"+2,4g "Span 80" were used. A stable emulsion was obtained which was stable at 20° C. and 60° C. for at least three weeks.

EXAMPLE 4

An emulsion was prepared according to Example 2 however with the difference that 2,4g "Span 20"+0,8 g. "Span 80" were used. A stable emulsion was obtained which was stable at 20° C. and 60° C. for at least three weeks.

EXAMPLE 5

The emulsion prepared in Example 2 (first part), is concentrated by means of a rotating evaporation device at a pressure of 30–3 mm Hg and (an oil bath) temp. of about 60° C. An emulsion with a final biopolymer concentration of 69% wt was obtained.

EXAMPLE 6

4 gr poly (isobutylene—maleic anhydride)—triethylene tetraamine reaction product and 196 g white spirit ("Shell Q3312") were mixed in a beaker glass. 200 g Xanthan biopolymer aqueous concentrate (9% wt) was added while using an ultra turrax mixer for 1 minute. An emulsion was obtained, which was stable at 20° C. and 60° C. for at least three weeks.

EXAMPLE 7

Procedure as Example 6, however, hydrocarbon liquid is xylene. A stable emulsion was obtained.

EXAMPLE 8

3 g poly (isobutylene—maleic anhydride)—triethylene tetraamine reaction product and 197 g white spirit "Shell Sol A" or "Shell Sol AB" were mixed as in Example 6. Stable emulsions with "Shell Sol A" respectively "Shell Sol AB" were obtained.

EXAMPLE 9

Emulsions prepared as in Example 8, were concentrated as described in Example 5. Emulsions with a biopolymer concentration of 58% wt resp. 61% wt were obtained.

EXAMPLE 10

198 g white spirit ("Shell Q 3312")+2 g "Ethomeen T12" were mixed in a beaker glass. Xanthan biopolymer aqueous concentrate (9% wt) was added with an ultra turrax mixer for 1 minute which gave a stable emulsion at 20° C. and 60° C. for at least three weeks.

EXAMPLE 11

Emulsion prepared as in Example 8 but with white spirit ("Shell Q 3312") is concentrated as in Example 5 until a concentration of polysaccharide is reached of 36% wt which was stable at ambient temperature for at least four weeks.

EXAMPLE 12

Emulsion prepared as in Example 2 with a combination of poly (isobutylene–maleic anhydride)-triethylene tetraamine reaction product and bis(2-hydroxyethyl)tallowamine in white spirit ("Shell Q 3312") or "Shell Sol T".

EXAMPLE 13

Emulsion prepared as in Example 12 is concentrated in a wiped-film-evaporation at a pressure of 40–10 mm Hg and (an oil bath) temperature of 80°–100° C. until a concentration of polysaccharide was reached of 26% wt.

EXAMPLE 14

An emulsion was prepared by mixing 4.0 g "Span 20", 1.0 g "Nonidet-NP50" 1.0 g "polymethacrylate and 8.0 g "Ondina 15" and 186 g Shellsol "TD". 200 g Xanthan biopolymer aqueous concentrate 9% wt derived from Xanthomonas campestris NCIB 11854 was added, while using an ultra turrax mixer for 1 min. After concentration in an evaporating device an emulsion with a concentration of biopolymer of 55% wt was obtained which appears to be stable at 20° C. and 60° C. for at least 12 weeks. Furthermore this emulsion appears to hydrate extremely fast and complete and is in this respect far superior to a typical Xanthan powder like "Kelsan XC".

We claim:

1. A biopolymer water-in-oil emulsion which comprises
   30-65% wt biopolysaccharide in the form of prior water-swollen particles
   15-40% wt hydrophobic liquid
   5-25% wt water
   5-25% wt emulsifier selected from poly (isobutylene–maleic anhydride)-triethylene tetraamine reaction product, bis(2-hydroxyethyl)tallowamine, tallowamine or combinations thereof and
   1-15% wt stabilizer selected from the group consisting of polyalkylmethacrylates, polyalkylacrylates, copolymers of alkylacrylates with vinyl pyridines and copolymers of alkylmethacrylates with vinylpyridines or combinations thereof.

2. Biopolymer emulsion as claimed in claim 1 in which the polysaccharide is derived form *Xanthomonas campestris* NCIB 11808, *Xanthomonas campestris* NCIB 11854, Pseudomonas sp. NCIB 11624 and Pseudomonas sp NCIB 11592.

3. Biopolymer emulsion as claimed in claim 6 in which the polysaccharide is derived from a clarified and optionally concentrated fermentation broth being an aqueous solution, substantially free from cellular debris which contains 3-25% wt polysaccharide.

4. Biopolymer emulsion as claimed in claim 7 in which the hydrophobic liquid is a mixture of a hydrocarbon solvent boiling between 110° and 220° C. and a hydrocarbon solvent boiling between 280°-400° C.

5. A process for preparing a biopolymer emulsion comprising
   30-65% wt biopolysaccharide in the form of prior water-swollen particles
   15-40% wt hydrophobic liquid
   5-25% wt water
   5-25% wt emulsifier selected from the group consisting of poly (isobutylene–maleic anhydride)–triethylene tetraamine reaction product, bis(2-hydroxyethyl) tallowamine, tallowamine or combinations thereof and
   1-15% wt stabilizer selected from the group consisting of polyalkylmethacrylates, polyalkylacrylates, copolymers of aklylacrylates with vinyl pyridines and copolymers of alkylmethacrylates with vinylpyridiens or combinations thereof which process comprises forming the emulsion using prior water-swollen biopolymer particles in the form of an aqueous solution of up to 10% by weight thereof.

6. A method according to claim 5 wherein the emulsifier is a mixture of poly (isobutylene—maleic anhydride)—triethylene tetraamine reaction product and bis(2-hydroxyethyl)tallowamine.

7. A method according to claim 6 wherein the polysaccharide is derived from *Xanthomonas campestris* (NCIB 11808, *Xanthomonas campestris* NCIB 11854, Pesudomonas sp. NCIB 11624 or Pseudomonas sp. NCIB 11592.

8. A method according to claim 5 wherein the polysaccharide is derived from a clarified and optionally concentrated fermentation broth being an aqueous solution, substantially free from cellular debris which contains 3-25% wt polysaccharide.

9. A method according to claim 8 wherein the hydrophobic liquid is a mixture of a hydrocarbon solvent boiling between 110° and 220° C. and a hydrocarbon solvent boiling between 280°-400° C.

* * * * *